(12) United States Patent
Donohoo et al.

(10) Patent No.: US 9,834,390 B2
(45) Date of Patent: Dec. 5, 2017

(54) BULK CARGO BLENDING HOPPER

(71) Applicant: Apex Business Holdings, L.P., Calvert City, KY (US)

(72) Inventors: Mark K. Donohoo, Calvert City, KY (US); Michael L. Walker, Paducah, KY (US); Michael A. Meredith, Paducah, KY (US); Steven W. Spahn, Evansville, IN (US); Jeffery H. West, Newburgh, IN (US)

(73) Assignee: Apex Business Holdings, L.P., Calvert City, KY (US)

( * ) Notice: Subject to any disclaimer, the term of this patent is extended or adjusted under 35 U.S.C. 154(b) by 0 days.

(21) Appl. No.: 15/132,907

(22) Filed: Apr. 19, 2016

(65) Prior Publication Data

US 2017/0297830 A1    Oct. 19, 2017

(51) Int. Cl.

| | |
|---|---|
| *B01F 3/18* | (2006.01) |
| *B65G 53/26* | (2006.01) |
| *B65G 65/32* | (2006.01) |
| *B65G 65/40* | (2006.01) |
| *B65D 88/26* | (2006.01) |
| *B01F 5/10* | (2006.01) |

(52) U.S. Cl.
CPC .............. *B65G 53/26* (2013.01); *B01F 3/188* (2013.01); *B01F 5/10* (2013.01); *B65D 88/26* (2013.01); *B65G 65/32* (2013.01); *B65G 65/40* (2013.01); *B01F 3/18* (2013.01); *B65G 2201/042* (2013.01); *B65G 2812/1658* (2013.01)

(58) Field of Classification Search
CPC ........ B65D 88/26; B65G 53/26; B65G 65/32; B65G 65/40; B65G 2201/042; B65G 2812/1658; B01F 5/10; B01F 3/188; B01F 3/18

See application file for complete search history.

(56) References Cited

U.S. PATENT DOCUMENTS

| | | | | |
|---|---|---|---|---|
| 2,946,626 | A * | 7/1960 | Atkinson | B65G 53/28 406/109 |
| 4,165,133 | A * | 8/1979 | Johnson | B05B 7/1404 193/2 R |
| 7,846,399 | B2 * | 12/2010 | Albin | C10G 11/18 406/122 |
| 9,315,738 | B2 * | 4/2016 | Albin | C10G 11/18 |
| 9,504,975 | B2 * | 11/2016 | Yaluris | B01J 8/0015 |
| 9,637,325 | B2 * | 5/2017 | Albin | C10G 11/18 |
| 2014/0255110 | A1 * | 9/2014 | Albin | C10G 11/18 406/145 |

* cited by examiner

*Primary Examiner* — Frederick C Nicolas
(74) *Attorney, Agent, or Firm* — Joseph M. Rolnicki; Evans & Dixon, L.L.C.

(57) ABSTRACT

A bulk cargo blending hopper has a hollow interior volume that is selectively communicated with a source of vacuum pressure. A first conduit has a first end that is connected to the housing of the hopper and communicates with the interior volume of the housing of the hopper. An opposite second end of the first conduit is configured for communication with a source of bulk cargo that is separate from the hopper. A second conduit has a first end that is also connected to a portion of the housing of the hopper and communicates with the interior portion of the housing. A second end of the second conduit is also connected to a portion of the housing of the hopper and communicates with the interior volume of the housing of the hopper.

18 Claims, 3 Drawing Sheets

BULK CARGO BLENDING HOPPER

FIELD

The field of the invention is a bulk cargo hopper that stores and dispenses bulk cargo. More specifically, the field of the invention is a bulk cargo hopper that employs vacuum pressure to draw bulk cargo to the hopper and into an interior volume of the hopper. The hopper then employs vacuum pressure to mix the bulk cargo in the interior volume of the hopper and blend together bulk cargo having different colors.

BACKGROUND

Bulk cargo hoppers that store and dispense bulk cargo are well known. The typical bulk cargo hopper employs vacuum pressure to draw bulk cargo to the hopper and into an interior volume of the hopper. The bulk cargo drawn to the hopper is temporarily stored in the hopper. When it is desired to dispense the stored bulk cargo from the hopper, the vacuum pressure supplied to the hopper is stopped and an outlet valve at the bottom of the hopper is opened. This allows a desired amount of the stored bulk cargo to fall from the interior volume of the hopper and into a container positioned below the outlet valve. When the container is filled with the dispensed bulk cargo to a desired amount, the outlet valve is closed. The container is then moved from beneath the hopper, allowing a further container to be positioned below the outlet valve of the hopper and filled with a desired amount of the bulk cargo from the hopper by opening the outlet valve.

Hoppers of the type described above are employed in the production of plastic material in the form of pellets, granules, powders, etc. that are later used in plastic extrusion manufacturing processes. The plastic material, for example small plastic pellets of a single color are drawn into the interior volume of the hopper by the vacuum pressure in the interior of the hopper supplied by a vacuum pressure source.

When it is desired to fill a container with the colored pellets, the vacuum pressure supplied to the hopper is stopped and the outlet valve of the hopper is opened. This allows a desired amount of colored pellets in the hopper to fall into the container.

A disadvantage of this product transferring method is that batches of the colored pellets produced and supplied to the hopper will often have slightly different colors. For example, a first batch of red pellets fed to the hopper may have a particular shade of red. A second batch of red pellets fed to the hopper and layered on top of the first batch of pellets may have a slightly different shade of red.

At some time during the unloading of the pellets from the hopper to a container, a portion of the first batch of pellets will be loaded into a container together with a portion of the second batch of pellets. The container, containing pellets of slightly different colors would then be sent to a manufacturer of plastic products. This would result in the manufacturer manufacturing plastic products having two different colors. For example, the manufacturer would manufacture a group of products having one shade of red and another group of products having a slightly different shade of red. This is an undesirable occurrence for the manufacturer that desires all of their products offered to consumers have the same color.

SUMMARY

The bulk cargo blending hopper of this disclosure overcomes the above described problem of sending a container of pellets to a manufacturer where the container contains a layer of pellets of one color and a second layer of pellets of a slightly different color.

The hopper has a housing that is constructed in a conventional manner. The housing has an interior volume that is continuous through the housing.

A source of vacuum pressure communicates with the interior volume of the housing. Again, the source of vacuum pressure and its communication with the interior of the housing are conventional.

A first conduit is connected to the housing. The first conduit has a length with opposite first and second ends. The first end of the first conduit is connected to the housing and communicates with the interior volume of the housing. The second end of the first conduit is configured to communicate with a source of bulk cargo.

A second conduit is also connected to the housing. The second conduit has a length with opposite first and second ends. The first end of the second conduit is connected to an upper portion of the housing and communicates with an upper portion of the interior volume of the housing. The second end of the second conduit is connected to a lower portion of the housing and communicates with a lower portion of the interior volume of the housing. The first end of the second conduit is positioned on the housing vertically above the second end of the conduit.

An outlet valve is provided on the housing at the bottom of the housing. The outlet valve is conventional and is operable when there is no vacuum pressure supplied to the housing to open and dispense bulk cargo in the hopper to a container below the hopper. The outlet valve is also operable to close, enabling vacuum pressure to fill the interior volume of the housing.

In operation of the hopper, the outlet valve is closed and vacuum pressure is supplied from a vacuum source to the interior volume of the hopper. The vacuum pressure in the interior volume of the hopper is communicated through the first conduit. Bulk cargo at the second end of the first conduit is drawn through the first conduit by the vacuum pressure in the interior volume of the hopper. A first batch of bulk cargo is drawn into the interior volume of the hopper and fills the bottom portion of the interior volume.

To further fill the interior volume of the housing, the second end of the first conduit is communicated with a second batch of bulk cargo which could have a slightly different color than the first batch of bulk cargo. The vacuum pressure in the interior volume of the housing draws the second batch of the bulk cargo through the first conduit and into the upper portion of the interior volume of the housing. The second batch of bulk cargo drawn into the interior volume of the housing forms a layer on top of the first batch of bulk cargo in the interior volume of the housing.

To overcome the problem of the first batch of bulk cargo in the interior volume of the housing and the second batch of bulk cargo in the interior volume of the housing having slightly different colors, the source of vacuum pressure communicated to the interior volume of the housing is switched to the second conduit. The vacuum pressure in the interior volume of the housing is communicated to the first end of the second conduit. The vacuum pressure at the first end of the second conduit is communicated through the second conduit to the second end of the second conduit that communicates with the lower portion of the interior volume of the housing. This results in the first batch of bulk cargo at the lower portion of the interior volume of the housing being drawn into the second conduit from the second end of the second conduit. The bulk cargo is drawn up through the second conduit to the first end of the second conduit where the first batch of bulk cargo is delivered into the upper portion of the interior volume of the housing on top of the second batch of bulk cargo. This process is continued until the first batch of bulk cargo is drawn from the lower portion of the interior volume of the housing and deposited into the upper portion of the interior volume on top of the second batch of bulk cargo. The second batch of bulk cargo then begins to be drawn through the second conduit up to the upper portion of the housing interior volume. This cycling of the bulk cargo through the second conduit is continued and results in mixing and blending of the bulk cargo of the first batch with the bulk cargo of the second batch.

On completion of the blending process, the vacuum pressure supplied to the interior volume of the housing is stopped. The outlet valve at the bottom of the housing is then opened and the blended bulk cargo is allowed to fall from the interior volume of the housing into a container below the housing of the hopper.

BRIEF DESCRIPTION OF THE DRAWINGS

Further features of the bulk cargo blending hopper are set forth in the drawing figures and the detailed description.

DESCRIPTION

Figure 1:
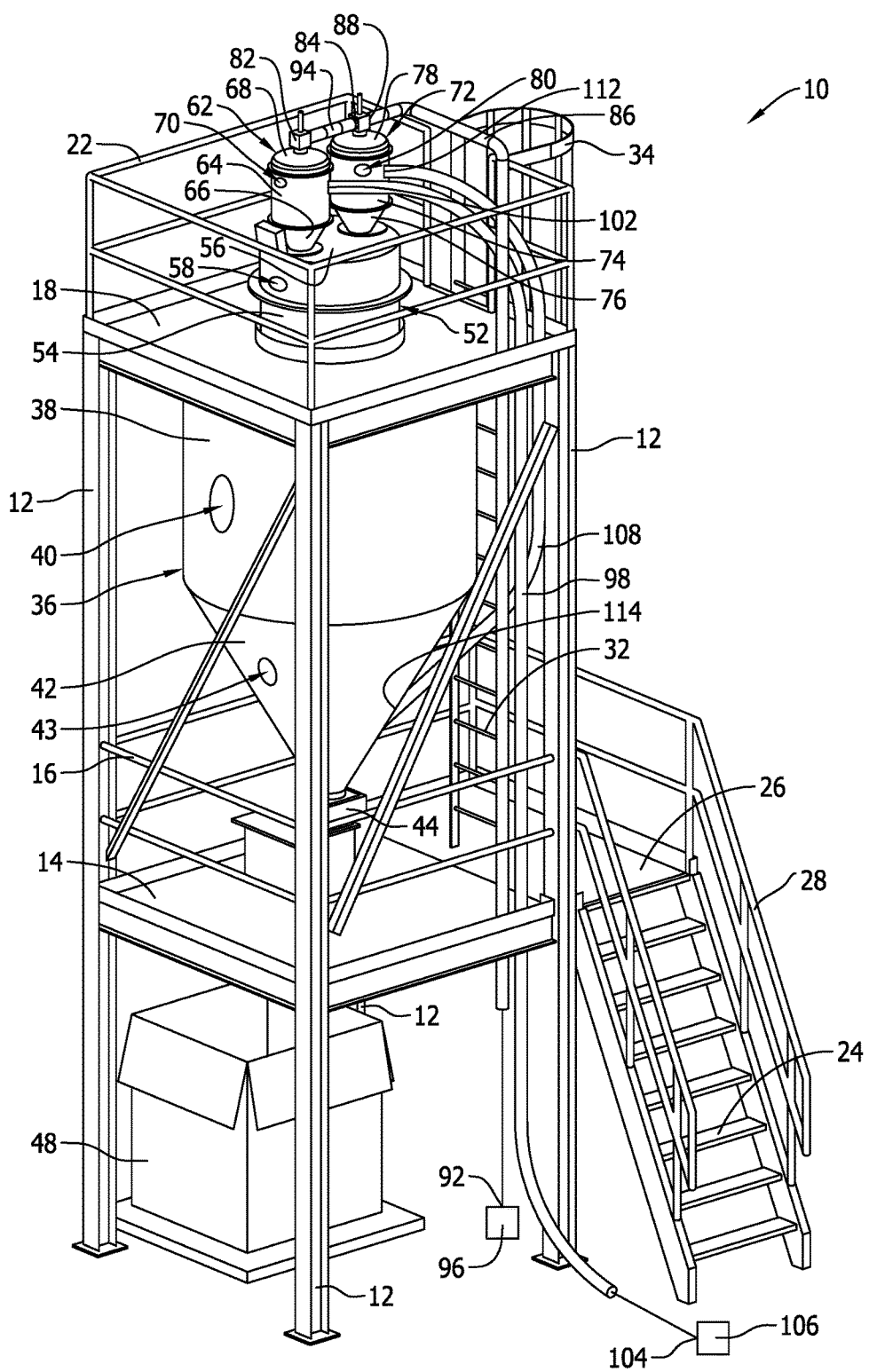
FIG. 1 is a top, perspective view of the bulk cargo blending hopper.
Figure 2:
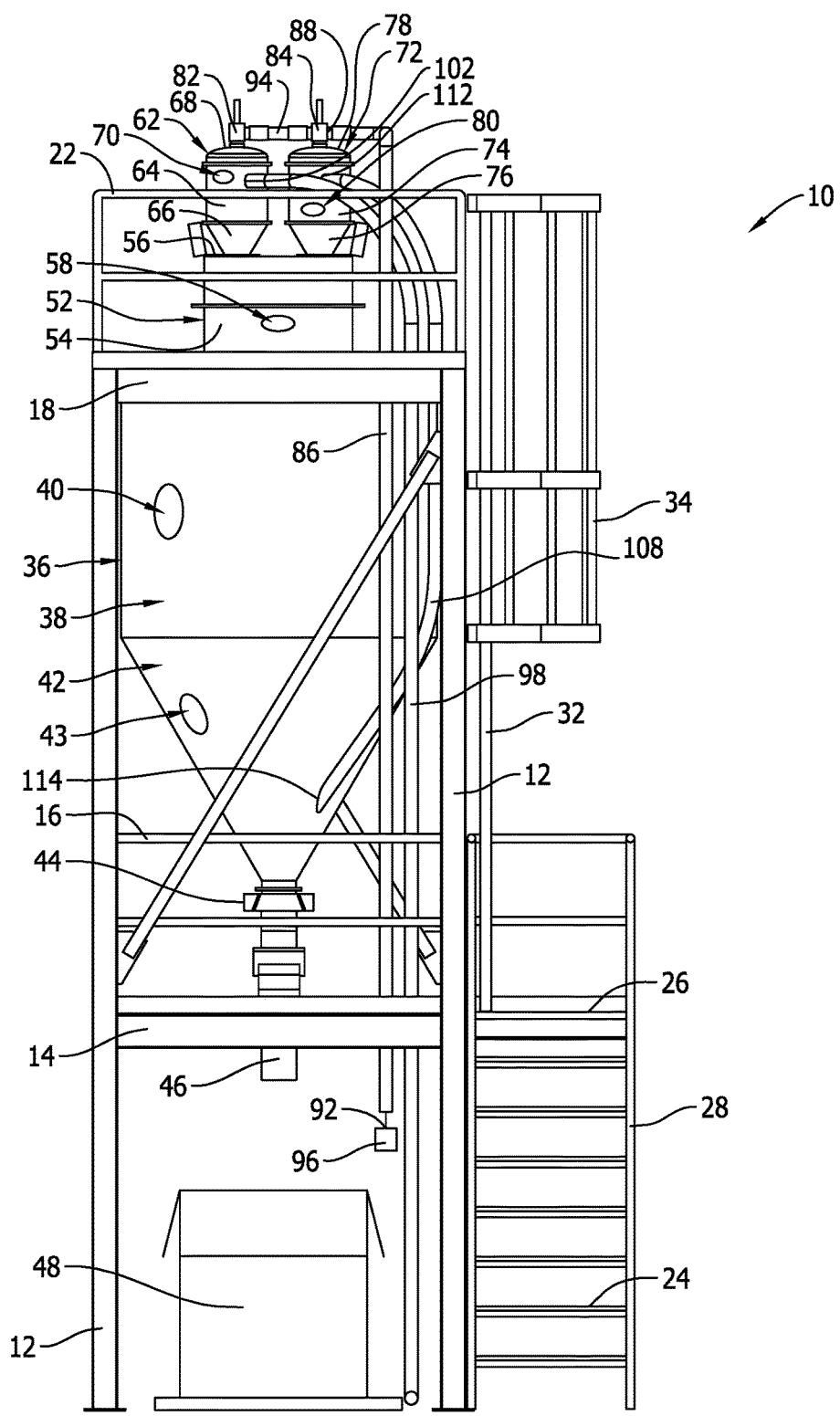
FIG. 2 is a side elevation view of the bulk cargo blending hopper.
Figure 3:
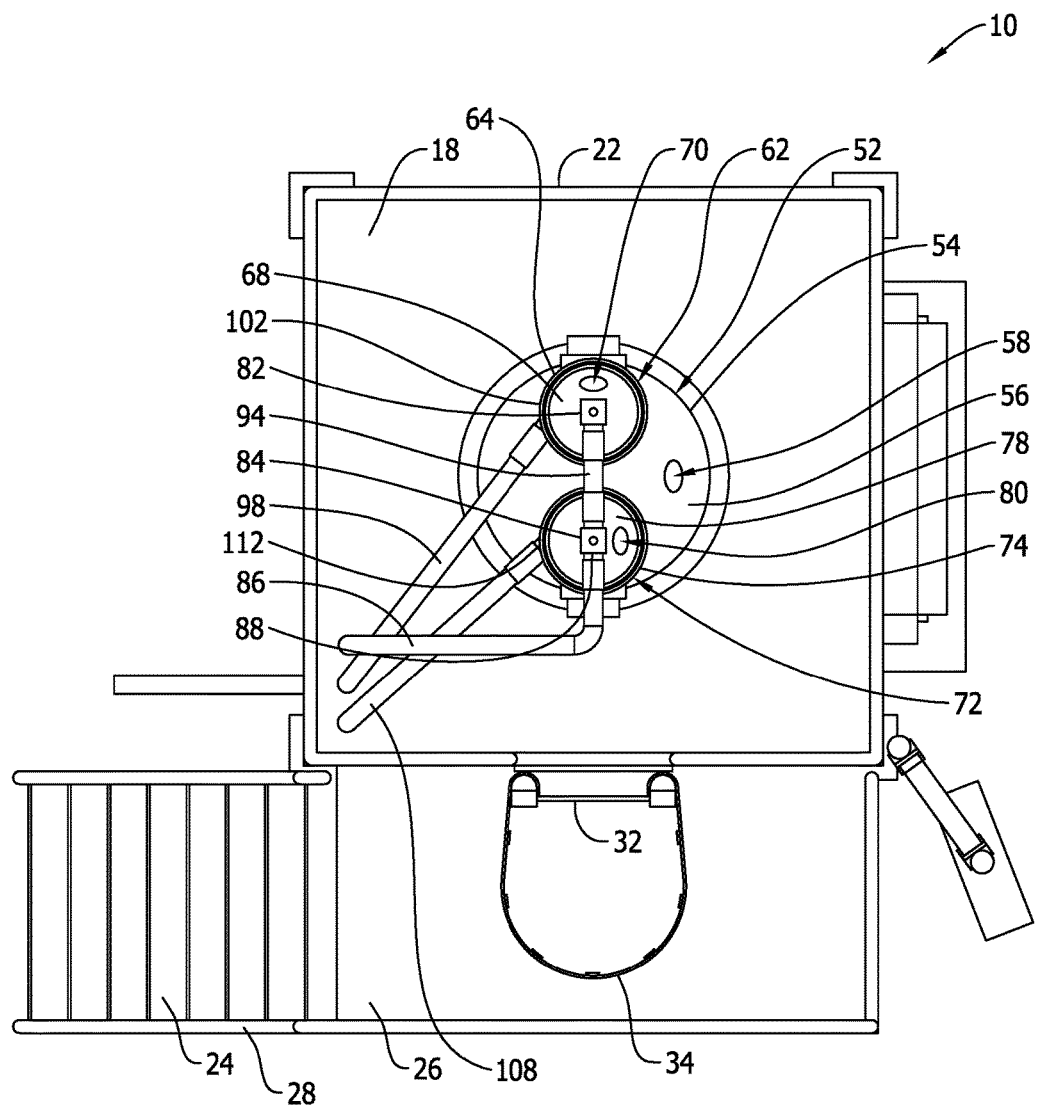
FIG. 3 is a top plan view of the bulk cargo blending hopper.

The component parts of the bulk cargo blending hopper 10 are constructed of metal or other equivalent materials typically employed in the construction of such types of hoppers.

The hopper 10 is supported by a frame that includes four vertical columns 12. As represented in the drawing figures, the four columns 12 are positioned at four corners of the frame. A rectangular lower platform 14 is supported by the four columns 12. A lower railing 16 extends around three sides of the lower platform 14.

An upper platform 18 is also supported by the four columns 12. An upper railing 22 extends around three sides of the upper platform 18 and a portion of the fourth side of the upper platform 18.

A set of stairs 24 are provided on the frame. The stairs 24 extend up to a landing 26. The landing 26 is an extension of the lower platform 14. Stair railings 28 extend along the opposite sides of the stairs 24 and around the landing 26.

A ladder 32 extends from the stair landing 26 upward to the upper platform 18. A protective cage 34 extends around the ladder 32.

The hopper 10 has a housing 36 that surrounds a hollow interior volume of the hopper.

The housing 36 has an upper portion wall 38. The upper portion wall 38 has a cylindrical configuration. However, other equivalent configurations could be employed. As represented in the drawing figures, the upper portion wall 38 of the housing is suspended downwardly from an underside of the upper platform 18. The upper portion wall 38 of the housing 36 surrounds an upper portion 40 of the hollow interior volume of the housing 36. The upper portion 40 of the hollow interior volume is identified in the drawing figures by an arrow that extends from the reference number 40 through a schematic representation of an opening through the upper portion wall 38 of the housing to the interior volume of the upper portion 40 of the hollow interior volume of the housing 36. In actuality, there is no opening through the upper portion wall 38.

The housing 36 also has a lower portion wall 42 that surrounds a lower portion 43 of the hollow interior volume of the housing 36. The lower portion 43 of the hollow interior volume of the housing 36 is identified in the drawing figures by an arrow that extends from the reference number 43 through a schematic representation of an opening through the lower portion wall 42 of the housing 36 to the lower portion 43 of the hollow interior volume of the housing 36. In actuality, there is no opening through the lower portion wall 42. The lower portion wall 42 of the housing 36 is connected to the upper portion wall 38 of the housing and is suspended downwardly from the upper portion wall 38 of the housing. As represented in the drawing figures, the lower portion wall 42 of the housing 36 has a conical configuration. Other equivalent configurations could be employed in the construction of the lower portion wall 42 of the housing. The conical configuration of the lower portion wall 42 of the housing extends downwardly from the upper portion wall 38 of the housing to an outlet valve mechanism 44 at the bottom of the lower portion 42 of the housing. The outlet valve mechanism 44 is operable to selectively open and allow bulk cargo to be dispensed from the housing 36, and close to stop dispensing of bulk cargo from the housing.

An outlet pipe 46 extends downwardly from the outlet valve mechanism 44. The outlet pipe 46 directs bulk cargo dispensed from the housing 36 downwardly from the outlet valve mechanism 44 to a container 48 positioned below the outlet pipe 46. The container represented in the drawing figures is a box. Other equivalent types of containers could be employed with the hopper 10.

The housing 36 also has a vacuum portion 52 at the top of the housing. The vacuum portion 52 has a cylindrical side wall 54 that is connected to and supported on a top surface of the upper platform 18. The vacuum portion 52 also has a circular top wall 56 supported on the top of the side wall 54. The side wall 54 and top wall 56 of the vacuum portion 52 have an interior volume 58 that communicates through the upper platform 18 with the hollow interior volume of the housing 36. The interior volume 58 of the vacuum portion 52 of the housing 36 is identified in the drawing figures by an arrow that extends from the reference number 58 through a schematic representation of an opening through the side wall 54 of the vacuum portion 52 to the interior volume 58 of the vacuum portion 52. In actuality, there is no opening through the side wall 54 of the vacuum portion 52. The interior volumes 58 of the vacuum portion 52, the upper portion 38 of the housing 36 and the lower portion 42 of the housing 36 together form a continuous volume through the housing 36 with no interior obstructions in the housing 36.

A first vacuum canister 62 is connected to the housing 36 of the hopper 10. As represented in the drawing figures, the first vacuum canister 62 has a cylindrical side wall 64, a conical bottom wall 66 and a domed shape top wall 68. The side wall 64, bottom wall 66 and top wall 68 surround an interior volume 70 of the first canister 62 that communicates with the hollow interior volume of the housing 36 through the top wall 56 of the housing vacuum portion 52. The interior volume 70 of the first canister 62 is identified in the drawing figures by an arrow that extends from the reference number 70 through a schematic representation of an opening through the side wall 64 of the canister 62 to the interior volume 70 of the canister 62. In actuality, there is no opening through the side wall 64 of the first vacuum canister 62.

A second vacuum canister 72 is also connected to the housing 36 of the hopper 10. The second vacuum canister 72 has substantially the same construction as the first vacuum canister 62. The second vacuum canister 72 includes a cylindrical side wall 74, a conical bottom wall 76 and a domed shape top wall 78. The side wall 74, bottom wall 76 and top wall 78 surround the interior volume 80 of the second vacuum canister 72 that communicates with the hollow interior volume of the housing 36 through the top wall 56 of the housing vacuum portion 52. The interior volume 80 of the second vacuum canister 72 is identified in the drawing figures by an arrow that extends from the reference number 80 through a schematic representation of an opening through the side wall 74 of the second vacuum canister 72 to the interior volume 80 of the second vacuum canister 72. In actuality, there is no opening through the side wall 74 of the second vacuum canister 72.

A first valve 82 is provided on top of the top wall 68 of the first vacuum canister 62. The first valve 82 is operable to provide communication with the interior volume 70 of the first vacuum canister 62 and to stop communication with the interior volume 70 of the first vacuum canister 62.

A second valve 84 is provided on the top wall 78 of the second vacuum canister 72. The second valve 84 is operable to establish communication with the interior volume 80 of the second vacuum canister 72 and to stop communication with the interior volume 80 of the second vacuum canister 72.

A vacuum conduit 86 is connected in communication with the hollow interior volume of the housing 36 of the hopper 10. The vacuum conduit 86 has a length with opposite first 88 and second 92 ends. The first end 88 of the vacuum conduit 86 is connected in communication with both the first valve assembly 82 and the second valve assembly 84. As represented in the drawing figures, the first end 88 of the vacuum conduit 86 is connected in communication directly with the second valve assembly 84 and then with the first valve assembly 82 by a short extension 94 of the vacuum conduit 86. The second end 92 of the vacuum conduit 86 is connected in communication with a source of vacuum pressure 96. The source of vacuum pressure 96 is represented schematically in the drawing figures.

A second conduit 98 is connected in communication with the hollow interior volume of the housing 36 of the hopper 10. The first conduit 98 has a length that extends between a first end 102 of the first conduit and a second end 104 of the first conduit. The length of the first conduit 98 is configured to convey bulk cargo to the interior volume of the housing 36. As represented in the drawing figures, the first end 102 of the first conduit 98 is connected to the side wall 64 of the first vacuum canister 62 and communicates with the interior volume of the housing 36 through the interior volume 70 of the first vacuum canister 62 and through the interior volume 58 of the vacuum portion 52 of the housing 36. The second end 104 of the first conduit 98 is configured for communication with a source of bulk cargo 106, represented schematically in FIG. 1. The source of bulk cargo 106 is separated from the hopper 10.

A second conduit 108 communicates with the hollow interior volume of the housing 36. The second conduit 108 has a length that extends between a first end 112 of the second conduit and a second end 114 of the second conduit. The length of the second conduit 108 is configured for conveying bulk cargo. The first end 112 of the second conduit 108 is connected to the side wall 74 of the second vacuum canister 72 and the second end 114 of the second conduit 108 is connected to the lower portion 42 of the housing 36 below the first end 112 of the conduit. As represented in the drawing figures, the first end 112 of the second conduit 108 communicates with the hollow interior volume of the housing 36 through the side wall 74 of the second vacuum canister 72, through the interior volume 80 of the second vacuum canister 72 and through the interior volume 58 of the vacuum portion 52 of the housing 36. The second end 114 of the second conduit 108 communicates with the lower portion 43 of the hollow interior volume of the housing 36 through the lower portion 42 of the housing.

In operation of the hopper 10, the outlet valve 44 is closed and vacuum pressure is supplied from the vacuum source 96, through the vacuum conduit 86 to the interior volume of the housing 36. The vacuum pressure in the interior volume of the housing 36 is communicated through the first valve 82 and the first conduit 98. Bulk cargo at the second end 104 of the first conduit 98 is drawn through the first conduit by the vacuum pressure in the interior volume of the housing 36. A first batch of bulk cargo is drawn into the interior volume of the housing 36 and fills the lower portion 43 of the interior volume.

To further fill the interior volume of the housing 36, the second end 104 of the first conduit 98 is communicated with a second batch of bulk cargo which could have a slightly different color than the first batch of bulk cargo. The vacuum pressure in the interior volume of the housing 36 draws the second batch of the bulk cargo through the first conduit 98 and into the upper portion 40 of the interior volume of the housing 36. The second batch of bulk cargo drawn into the interior volume of the housing 36 forms a layer on top of the first batch of bulk cargo in the interior volume of the housing 36.

To overcome the problem of the first batch of bulk cargo in the interior volume of the housing 36 and the second batch of bulk cargo in the interior volume of the housing 36 having slightly different colors, the communication of the first valve 82 with the interior volume of the housing 36 is stopped and the second valve 84 is opened. The source of vacuum pressure communicated to the interior volume of the housing 36 is thereby switched to the second conduit 108. The vacuum pressure in the interior volume of the housing 36 is communicated to the first end 112 of the second conduit 108. The vacuum pressure at the first end 112 of the second conduit 108 is communicated through the second conduit 108 to the second end 114 of the second conduit 108 that communicates with the lower portion 43 of the interior volume of the housing 36. This results in the first batch of bulk cargo at the lower portion 43 of the interior volume of the housing 36 being drawn into the second conduit 108 from the second end 114 of the second conduit 108. The bulk cargo is drawn up through the second conduit 108 to the first end 112 of the second conduit 108 where the first batch of bulk cargo is delivered into the upper portion 40 of the interior volume of the housing 36 on top of the second batch of bulk cargo. This process is continued until the first batch of bulk cargo is drawn from the lower portion 43 of the interior volume of the housing and deposited into the upper portion 40 of the interior volume on top of the second batch of bulk cargo. The second batch of bulk cargo then begins to be drawn through the second conduit 108 up to the upper portion 40 of the housing interior volume. This cycling of the bulk cargo through the second conduit 108 is continued and results in mixing and blending of the bulk cargo of the first batch with the bulk cargo of the second batch.

On completion of the blending process, the vacuum pressure supplied to the interior volume of the housing 36 is stopped. The outlet valve 44 at the bottom of the housing 36 is then opened and the blended bulk cargo is allowed to fall from the interior volume of the housing 36 into a container 48 below the housing of the hopper.

As various modifications could be made in the construction of the apparatus and its method of operation herein described and illustrated without departing from the scope of the invention, it is intended that all matter contained in the foregoing description or shown in the accompanying drawings shall be interpreted as illustrative rather than limiting. Thus, the breadth and scope of the present disclosure should not be limited by any of the above described exemplary embodiments, but should be defined only in accordance with the following claims appended hereto and their equivalents.

What is claimed:

1. A hopper that stores and dispenses bulk cargo, the hopper comprising:
    a housing having an interior volume;
    a source of vacuum pressure communicating with the interior volume of the housing;
    a first conduit having a length with opposite first and second ends, the first end of the first conduit being connected to the housing communicating the first conduit with the interior volume of the housing, the second end of the first conduit being configured to communicate with a source of bulk cargo;
    a second conduit having a length with opposite first and second ends, the first end of the second conduit being connected to the housing communicating the second conduit with the interior volume of the housing, the second end of the second conduit being connected to the housing communicating the second conduit with the interior volume of the housing, the first end of the second conduit being vertically above the second end of the second conduit;
    a vacuum conduit having a length with opposite first and second ends, the first end of the vacuum conduit being operatively connected to the housing communication the vacuum conduit with the interior volume of the housing, and the second end of the vacuum conduit being operatively connected to the source of vacuum pressure; and,
    the first conduit, the second conduit and the vacuum conduit being the only conduits that communicate with the interior volume of the housing.

2. A hopper that stores and dispenses bulk cargo, the hopper comprising:
    a housing having an interior volume;
    a source of vacuum pressure communicating with the interior volume of the housing;
    a first conduit having a length with opposite first and second ends, the first end of the first conduit being, connected to the housing communicating the first conduit with the interior volume of the housing, the second end of the first conduit being configured to communicate with a source bulk cargo;
    a second conduit having a length with opposite first and second ends, the first end of the second conduit being connected to the housing communicating the second conduit with the interior volume of the housing, the second end of the second conduit being connected to the housing communicating the second conduit with the interior volume of the housing, the first end of the second conduit being vertically above the second end of the second conduit;
    a first valve on the housing, the first valve operatively communicating with the interior volume of the housing and with the source of vacuum pressure, the first valve being operable to enable communication of the source of vacuum pressure with the interior volume of the housing and to disable communication of the source of vacuum pressure with the interior volume of the housing; and,
    a second valve on the housing, the second valve operatively communicating with the interior volume of the housing and with the source of the vacuum pressure, the second valve being operable to enable communication of the source of vacuum pressure with the interior volume of the housing and to disable communication of the source of vacuum pressure with the interior volume of the housing.

3. The hopper of claim 2, further comprising:
    a vacuum conduit having a length with opposite first and second ends, the first end of the vacuum conduit being operatively connected to the first valve and the second valve; and,
    the second end of the vacuum conduit being operatively connected to the source of vacuum pressure.

4. The hopper of claim 3, further comprising:
    the first conduit, the second conduit and the vacuum conduit being the only conduits that communicate with the interior volume of the housing.

5. The hopper of claim 4, further comprising:
    a first vacuum canister connected to the housing, the first vacuum canister having an interior volume that communicates with the interior volume of the housing;
    a second vacuum canister connected to the housing, the second vacuum canister having an interior volume that communicates with the interior volume of the housing;
    the first valve being connected to a top of the first canister;
    the first end of the first conduit being connected to a side of the first vacuum canister;
    the second valve being connected to a top of the second vacuum canister; and,
    the first end of the second conduit being connected to a side of the second vacuum canister.

6. The hopper of claim 2, further comprising:
    an outlet valve operatively connected with the housing, the outlet valve being operable to selectively open and dispense bulk cargo from the housing and close and stop dispensing of the bulk cargo from the housing.

7. The hopper of claim 2, further comprising:
    a frame operatively connected to the housing, the frame supporting the housing.

8. A hopper that stores and dispenses bulk cargo, the hopper comprising:
    a housing having a hollow interior volume, the housing having an upper portion that surrounds an upper portion of the hollow interior volume and the housing having a lower portion that surrounds a lower portion of the hollow interior volume;
    a source of vacuum pressure communicating with the hollow interior volume of the housing;
    a first conduit having a length with opposite first and second ends, the first end of the first conduit being connected to the upper portion of the housing and communicating the first conduit with the upper portion of the hollow interior volume, the second end of the first conduit being configured for communicating with a supply of bulk cargo that is separate from the hopper; and,
    a second conduit having a length with opposite first and second ends, the first end of the second conduit being connected to the upper portion of the housing and communicating with the upper portion of the hollow interior volume of the housing, and the second end of the second conduit being connected to the lower portion of the housing and communicating with the lower portion of the hollow interior volume of the housing.

9. The hopper of claim 8, further comprising:
a vacuum conduit having a length with opposite first and second ends, the first end of the vacuum conduit being operatively connected to the housing communicating the vacuum conduit with the hollow interior volume of the housing, and the second end of the vacuum conduit being operatively connected to the source of vacuum pressure.

10. The hopper of claim 9, further comprising:
the first conduit, the second conduit and the vacuum conduit being the only conduits that communicate with the hollow interior volume of the housing.

11. The hopper of claim 8, further comprising:
a first valve on the housing, the first valve operatively communicating with the hollow interior volume of the housing and with the source of vacuum pressure, the first valve being operable to enable communication of the source of vacuum pressure with the hollow interior volume of the housing and to disable communication of the source of vacuum pressure with the hollow interior volume of the housing; and,
a second valve on the housing, the second valve operatively communicating with the hollow interior volume of the housing and with the source of the vacuum pressure, the second valve being operable to enable communication of the source of vacuum pressure with the hollow interior volume of the housing and to disable communication of the source of vacuum pressure with the hollow interior volume of the housing.

12. The hopper of claim 11, further comprising:
a vacuum conduit having a length with opposite first and second ends, the first end of the vacuum conduit being operatively connected to the first valve and the second valve; and,
the second end of the vacuum conduit being operatively connected to the source of vacuum pressure.

13. The hopper of claim 12, further comprising:
the first conduit, the second conduit and the vacuum conduit being the only conduits that communicate with the hollow interior volume of the housing.

14. The hopper of claim 13, further comprising:
a first vacuum canister connected to the housing, the first vacuum canister having an interior volume that communicates with the hollow interior volume of the housing;
a second vacuum canister connected to the housing, the second vacuum canister having an interior volume that communicates with the hollow interior volume of the housing;
the first valve being connected to a top of the first canister;
the first end of the first conduit being connected to a side of the first vacuum canister;
the second valve being connected to a top of the second vacuum canister; and,
the first end of the second conduit being connected to a side of the second vacuum canister.

15. The hopper of claim 8, further comprising:
an outlet valve operatively connected with the lower portion of the housing, the outlet valve being operable to selectively open and dispense bulk cargo from the lower portion of the housing and close and stop dispensing of the bulk cargo from the lower portion of the housing.

16. The hopper of claim 8, further comprising:
a frame operatively connected to the upper portion of the housing and the lower portion of the housing, the frame supporting the upper portion of the housing above the lower portion of the housing.

17. A method of blending bulk cargo in a hopper, the method comprising:
conveying bulk cargo into an interior volume of a housing of the hopper;
providing a conduit on the hopper with a first end of the conduit being connected to an upper portion of the housing and communicating with an upper portion of the interior volume of the housing and with a second end of the conduit being connected to a lower portion of the housing and communicating with a lower portion of the interior volume of the housing;
supplying vacuum pressure to the interior volume of the housing; and,
the vacuum pressure in the housing drawing the bulk cargo from the lower portion of the interior volume of the housing, through the second end of the conduit, through the conduit and out from the conduit through the first end of the conduit to the upper portion of the interior volume of the housing.

18. The method of claim 17, further comprising:
continuing to supply vacuum pressure to the interior volume of the housing; and,
continuing to draw the bulk cargo from the lower portion of the interior volume of the housing, through the second end of the conduit, through the conduit and from the first end of the conduit to the upper portion of the interior volume of the housing.

* * * * *